(12) United States Patent
Giroux

(10) Patent No.: US 8,782,956 B2
(45) Date of Patent: Jul. 22, 2014

(54) MODULAR WINDOW ASSEMBLY

(75) Inventor: Éric Giroux, Granby (CA)

(73) Assignee: BDC Capital Inc., Montreal (CA)

( * ) Notice: Subject to any disclaimer, the term of this patent is extended or adjusted under 35 U.S.C. 154(b) by 34 days.

(21) Appl. No.: 13/098,690

(22) Filed: May 2, 2011

(65) Prior Publication Data

US 2011/0265387 A1 Nov. 3, 2011

Related U.S. Application Data

(60) Provisional application No. 61/329,970, filed on Apr. 30, 2010.

(51) Int. Cl.
*E06B 1/04* (2006.01)
*E06B 3/964* (2006.01)
*B60J 1/00* (2006.01)

(52) U.S. Cl.
CPC . *B60J 1/007* (2013.01); *E06B 3/964* (2013.01)
USPC .............................................. 49/504; 49/501

(58) Field of Classification Search
CPC ...... E06B 3/9641; E06B 3/9647; E06B 3/964
USPC .................... 49/504, 163; 52/204.67, 204.69, 52/204.71, 656.1, 656.2, 656.7, 656.5, 52/204.55, 204.56, 204.51
See application file for complete search history.

(56) References Cited

U.S. PATENT DOCUMENTS

| | | | |
|---|---|---|---|
| 3,712,005 A | 1/1973 | Eschbach et al. | |
| 3,927,492 A | 12/1975 | Carson | |
| 4,042,004 A | 8/1977 | Kwan | |
| 4,145,150 A * | 3/1979 | Rafeld | 403/295 |
| 4,205,486 A | 6/1980 | Guarnacci | |
| 4,233,781 A | 11/1980 | Roe | |
| 4,303,289 A * | 12/1981 | Hardy | 312/348.2 |
| 4,390,578 A * | 6/1983 | Brooks | 428/57 |
| 4,407,100 A * | 10/1983 | Huelsekopf | 52/204.54 |
| 4,555,869 A * | 12/1985 | Kenkel | 49/449 |
| 5,090,836 A * | 2/1992 | Hwang et al. | 403/295 |
| 5,676,418 A * | 10/1997 | Strefling | 296/180.1 |
| 5,724,779 A * | 3/1998 | Chang | 52/239 |
| 5,881,525 A * | 3/1999 | Riegelman et al. | 52/656.7 |
| 6,067,760 A * | 5/2000 | Nowell | 52/204.57 |
| 6,185,884 B1 * | 2/2001 | Myers et al. | 52/215 |
| 6,394,529 B2 | 5/2002 | Davis et al. | |
| 6,449,903 B1 * | 9/2002 | Borcherding | 49/74.1 |
| 7,555,871 B1 * | 7/2009 | Neal | 52/204.51 |

(Continued)

FOREIGN PATENT DOCUMENTS

EP 0681935 A1 11/1995
GB 2150182 A * 6/1985 ............... E06B 3/96

*Primary Examiner* — Katherine Mitchell
*Assistant Examiner* — Scott Denion
(74) *Attorney, Agent, or Firm* — Goudreau Gage Dubuc; Gwendoline Bruneau

(57) ABSTRACT

A frame assembly for a window, comprising at least a first frame comprising opposite lateral sides, a bottom and a top side; at least one corner connecting one of the lateral sides to the bottom and the top sides; and compression seals positioned between each corner and an extremity of a lateral side or of the top and bottom sides; each corner clipping into place between a lateral side and one of the top or bottom sides in an auto-sealing fashion around a glazing.

14 Claims, 14 Drawing Sheets

(56) References Cited

U.S. PATENT DOCUMENTS

| | | | |
|---|---|---|---|
| 7,596,912 B2* | 10/2009 | Ito et al. | 52/204.5 |
| 7,818,927 B1* | 10/2010 | John | 52/204.1 |
| 8,322,091 B2* | 12/2012 | Smith et al. | 52/208 |
| 2002/0095868 A1* | 7/2002 | McCauley | 49/413 |
| 2005/0129460 A1* | 6/2005 | Medcalf et al. | 403/403 |
| 2005/0160677 A1 | 7/2005 | Gepfrey et al. | |
| 2011/0192091 A1* | 8/2011 | Smith et al. | 49/490.1 |

\* cited by examiner

MODULAR WINDOW ASSEMBLY

CROSS REFERENCE TO RELATED APPLICATIONS

This application claims benefit of U.S. provisional application Ser. No. 61/329,970, filed on Apr. 30, 2010. All documents above are incorporated herein in their entirety by reference.

FIELD OF THE INVENTION

The present invention relates to windows. More specifically, the present invention is concerned with a modular window assembly.

BACKGROUND OF THE INVENTION

Windows in the residential, commercial and recreational vehicle markets need to provide low weight and high rigidity designs at low cost. In order to maintain manufacturing costs at an acceptable level while reaching the desired technical requirements, window frames provided in the art are often made of vinyl or aluminum extrusions.

Extrusions are straight material members with a precisely shaped section. State of the art techniques are used to cut and bend the extrusion such that a predetermined periphery is obtained. The bending process is time consuming and often requires dedicated machines and tooling. Since bending extrusions is a process having high tolerances, the final result is likely to vary. Bended extrusions falling outside acceptable tolerances cannot be used and are considered lost products to be recycled. It is not unusual to observe a high ratio of bended extrusions falling outside the acceptable tolerances.

Beside bent structures, other structures are found such as structures using short extrusion sections, machined and assembled with screws and other fasteners.

A variety of window types, in various sizes, are available on the market to meet customers' demand. Push out windows, vertical and horizontal sliding windows, amongst others, are fitted in a frame. Once installed, the frame supports the window and makes the junction between the surrounding wall and the window itself.

Each type of window has its own size and requests specific frame dimensions. The peripheral size varies in addition to the thickness of the window. As a result, window manufacturers must design a variety of frame types and develop extrusion tooling to accommodate a number of window types. Additionally, window manufacturers need to keep in stock a significant number of extrusions in order to meet customers' demand in a reasonable period of time. This necessitates significant floor space and may become a burden to manage. Moreover, bended-extrusion frames are cumbersome to transport, since, once bended, a frame has its final size and cannot be disassembled for transport. The shipping costs are increased given the significant volume of the frame.

The present invention seeks to meet these needs and other needs.

SUMMARY OF THE INVENTION

More specifically, in accordance with the present invention, there is provided a window frame assembly, comprising at least a first frame comprising opposite lateral sides, a bottom and a top side; at least one corner connecting one lateral side to the bottom and the top sides; and compression seals positioned between each corner and an extremity of one of the lateral side or of the top and bottom sides; wherein each corner clips into place between a lateral side and one of the top or bottom sides in an auto-sealing fashion around a glazing.

Other objects, advantages and features of the present invention will become more apparent upon reading of the following non-restrictive description of specific embodiments thereof, given by way of example only with reference to the accompanying drawings.

DESCRIPTION OF ILLUSTRATIVE EMBODIMENTS

Figure 1:
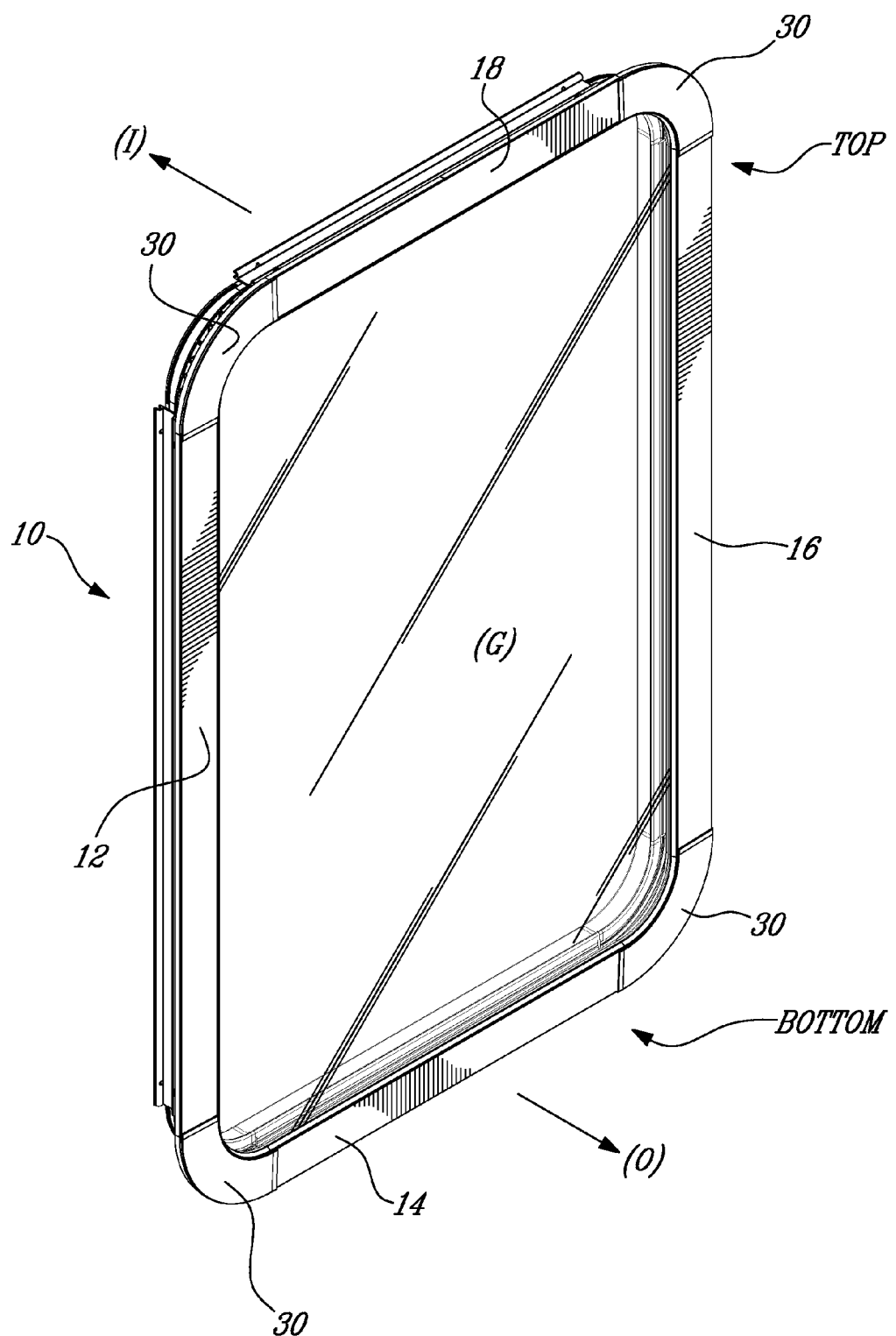
FIG. 1 is a front perspective view of a frame according to an embodiment of an aspect of the present invention.

The present invention is illustrated in further details by the following non-limiting examples.

FIGS. 1-5 show a window frame 10 according to an embodiment of an aspect of the present invention. The window frame 10 is a member comprising lateral side arms 12, 16, bottom side 14 and upper side 18, typically in aluminum, and plastic corners 30.

Such a frame 10 is installed in a corresponding aperture in a wall of a vehicle (not shown) from the outside (O), in an auto-sealing fashion as will be explained hereinbelow, thereby suppressing the need to provide sealing on the inside (I).

The window glazing (G) may be of glass or polymers, or typically any translucent material.

Since the corners 30 are molded, instead of made of extruded parts as known in the art, the frame 10 can have complex geometries and complex structural parts.

Such a window frame assembly may be fitted within an opening in the wall of a vehicle instead of a standard aluminum extruded window frame. For example, the window frame assembly may be fitted within an opening in the wall of a vehicle in place of the usual emergency exit windows (discussed hereinbelow in relation to FIG. 4).

Figure 4:
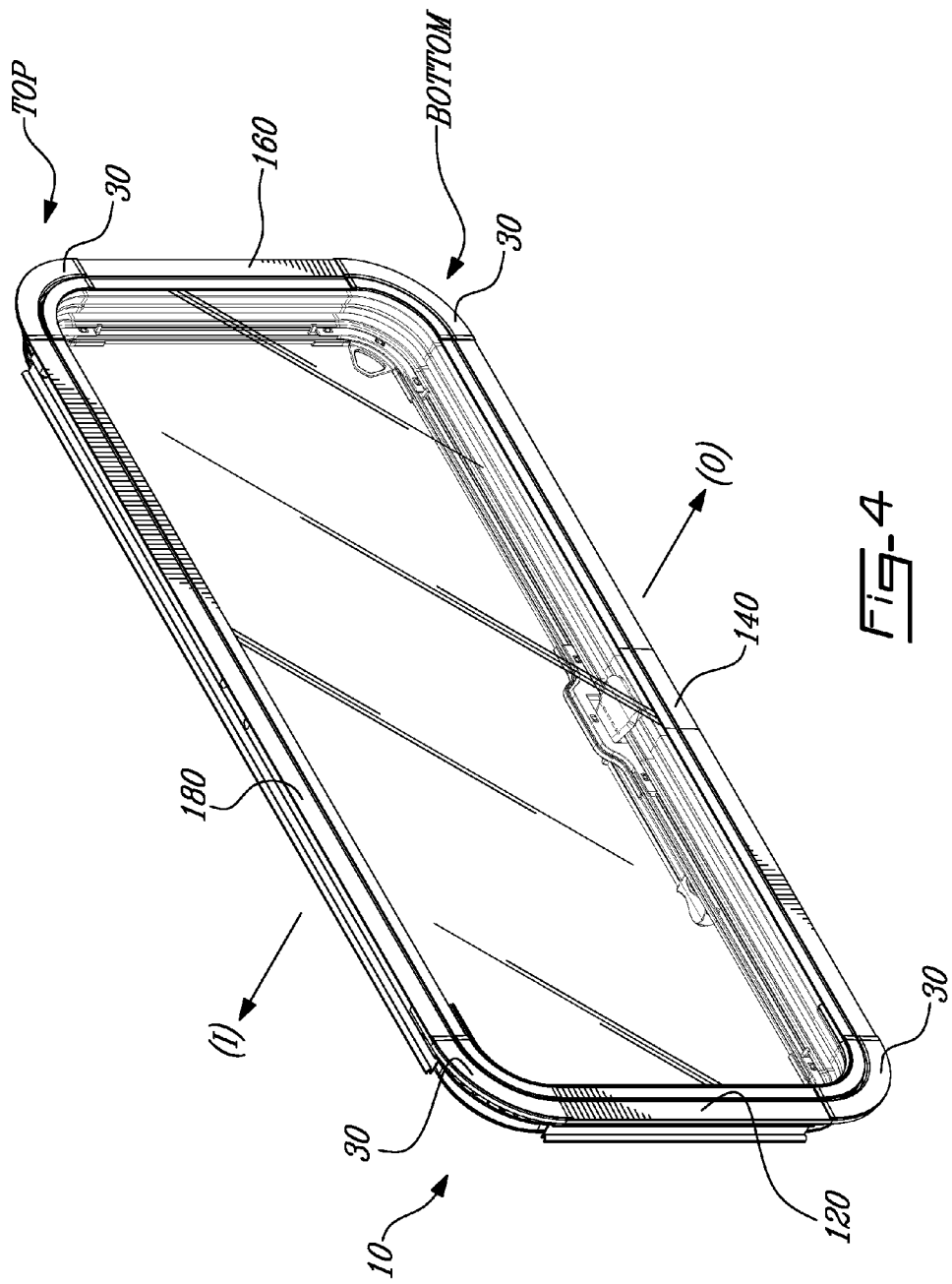
FIG. 4 is a front perspective view of a frame according to an embodiment of an aspect of the present invention.

Conventional emergency exit windows typically comprise a fixed frame, bolted to the wall of the vehicle, supporting a window glazing mounted on a hinge and comprising a handle (FIG. 4).

Figure 2:
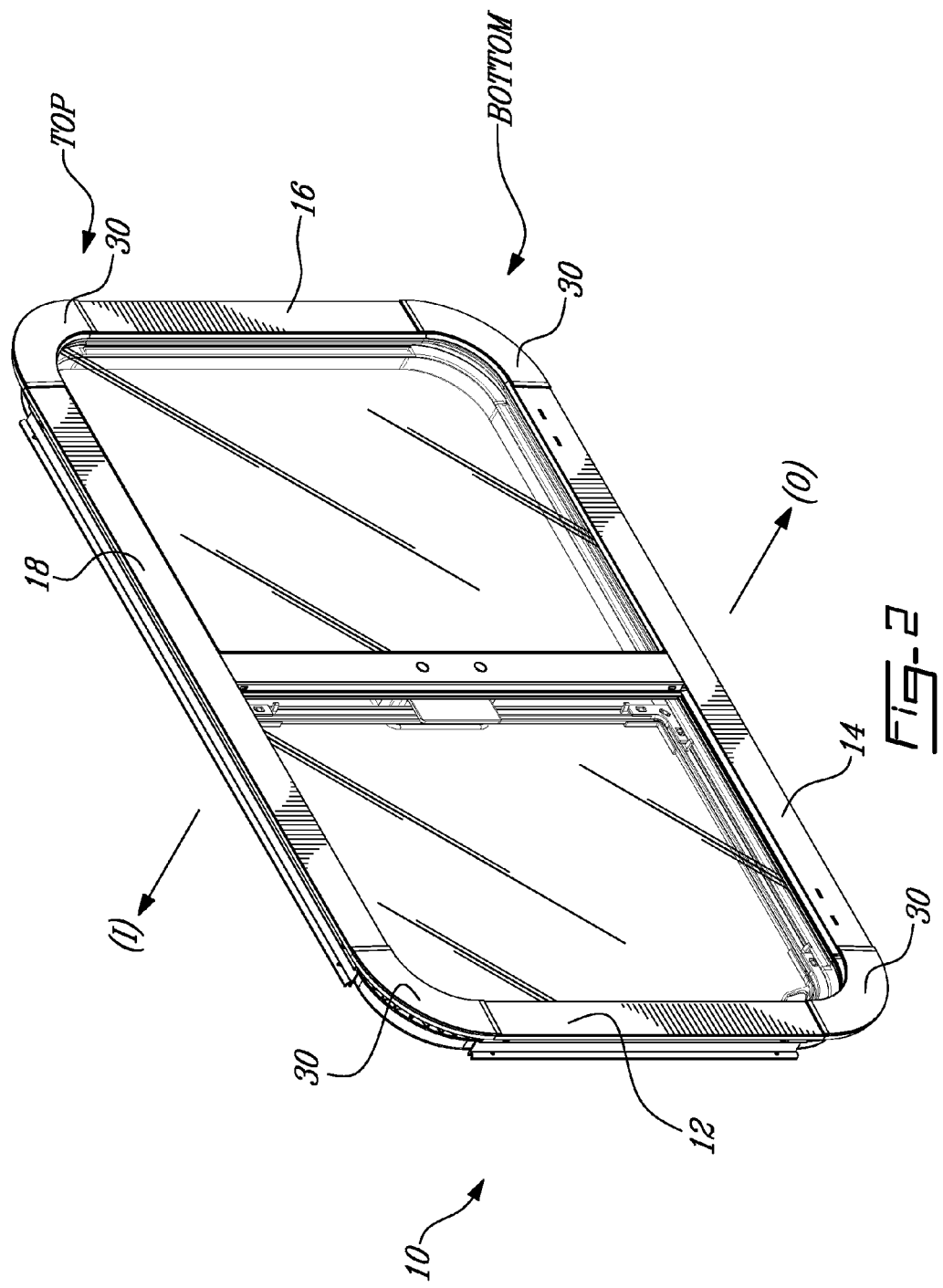
FIG. 2 is a front perspective view of a frame according to an embodiment of an aspect of the present invention.
Figure 3:
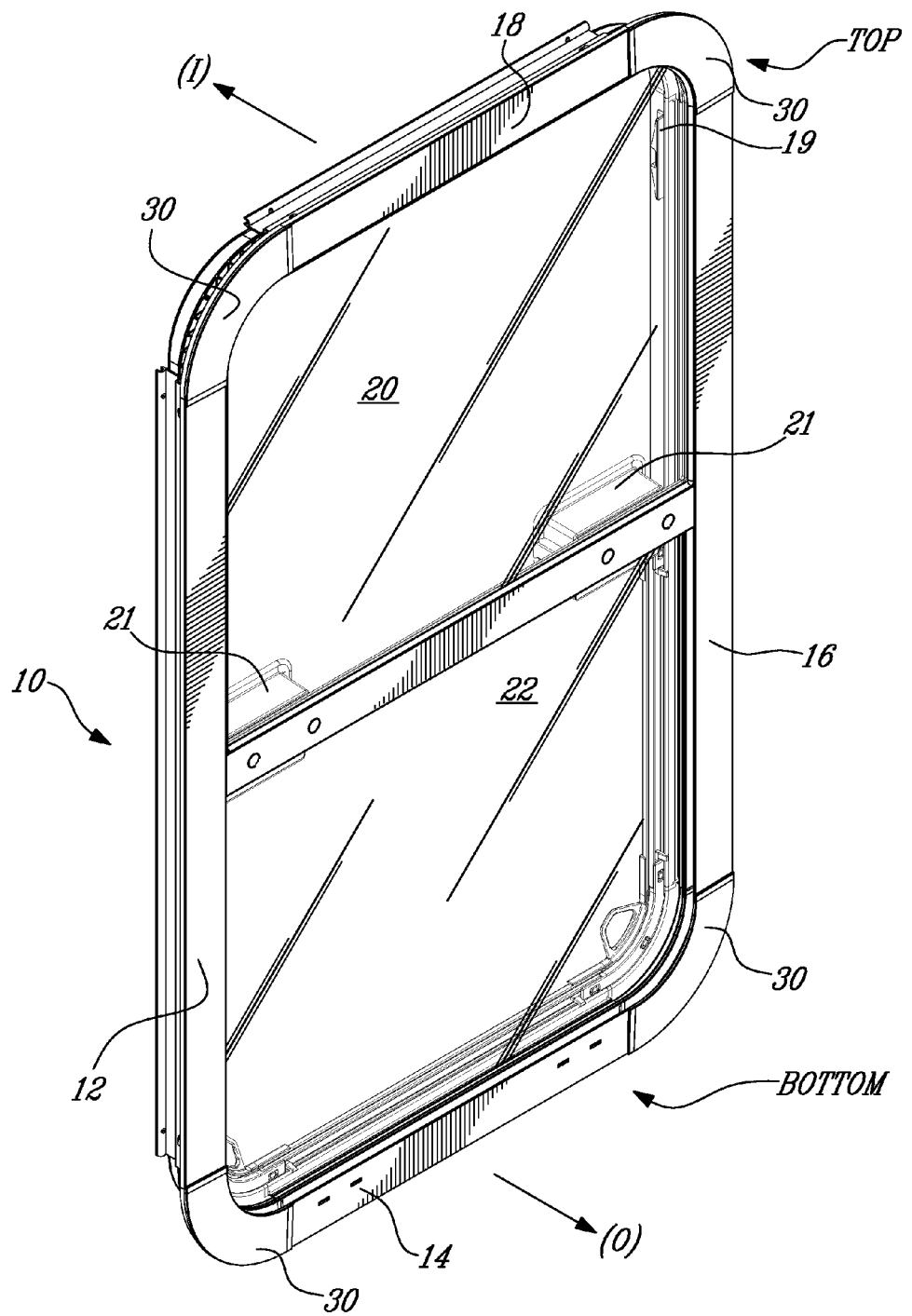
FIG. 3 is a front perspective view of a frame according to an embodiment of an aspect of the present invention.
Figure 5:
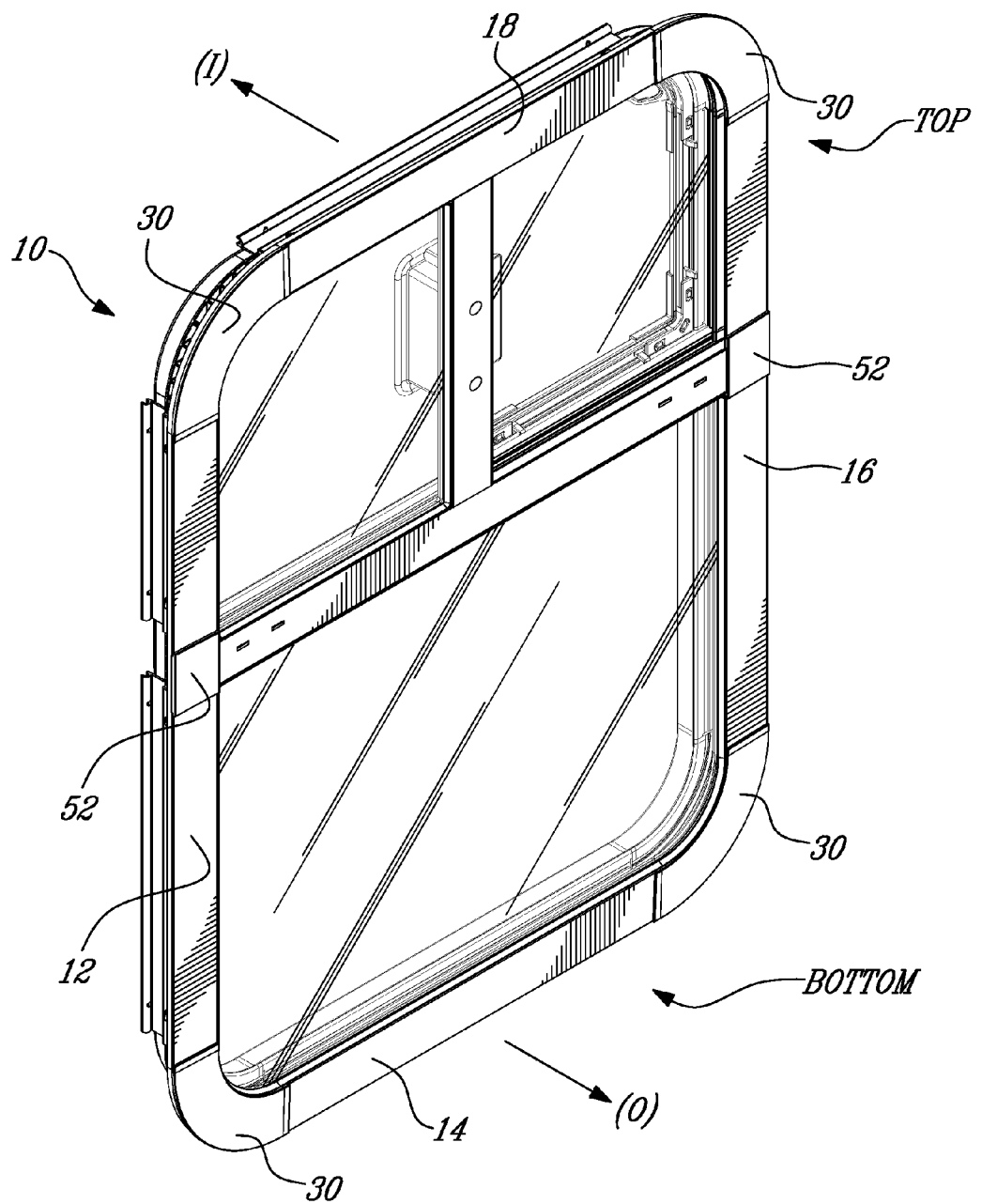
FIG. 5 is a front perspective view of a frame according to an embodiment of an aspect of the present invention.

The embodiment illustrated in FIG. 1 is typically a frame for a fixed window, whereas FIG. 2 illustrates a frame for a sliding window, FIG. 3 illustrates a frame for a hung window, FIG. 4 illustrates a frame for a push out window, and FIG. 5 illustrates a frame for a T-slider window.

In the case of a window comprising an a fixed part 20 and a mobile lower part 22 as shown in FIG. 3 for example, the mobile part 22 is allowed to move up, from a closed position shown in FIG. 3, between the two opposite side arms 12 and 16, along grooves (not shown) running along the length of the narrow faces of these side arms 12 and 16. In FIG. 3, the glazing of the lower mobile part 22 and the glazing of the upper fixed part 20 are identical, contrary to standard widow.

Figure 6:
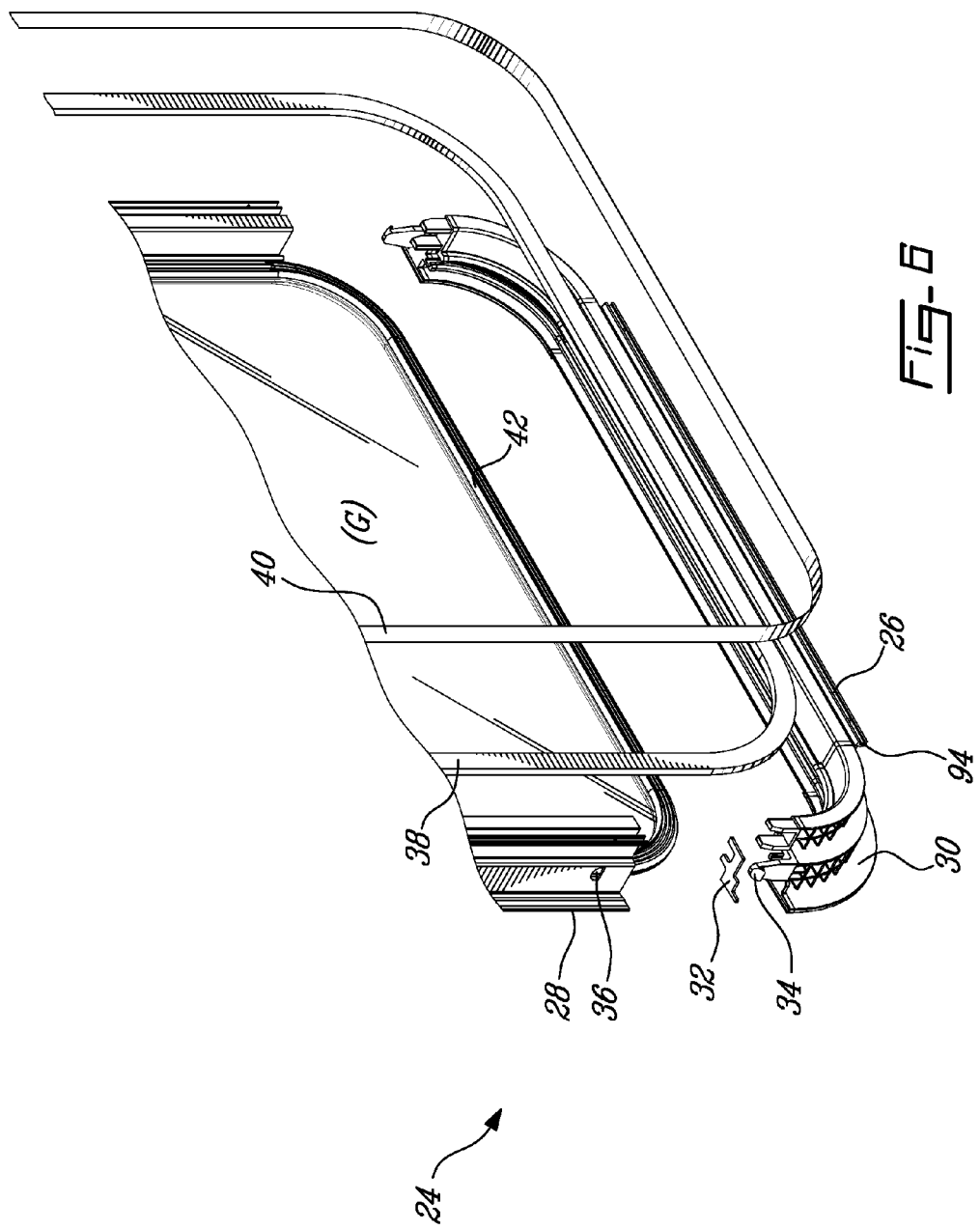
FIG. 6 is a partly exploded view of an outer frame according to an embodiment of an aspect of the present invention.

The frame 10 comprises an outer frame 24. As shown in FIG. 6 for a fixed window, the outer frame 24 is formed of upper and lower extrusions 26 (only lower extrusion 26 shown in FIG. 6) and sections of side extrusions 28 connected together by plastic molded corners 30. A compression seal 32 is positioned on each extremity of each corner 30, and, as seen in FIG. 6, the corner 30 is clipped into the extrusion 28 where it is retained by a clip 34 engaging an aperture 36 of the extrusion 28. A tightening belt 40 may be further tensioned around the periphery of the assembled frame 24 to ensure tightness of the assembly by compressing the compression seals 32 and neatly clipping together the corners 30 and the extrusions sections 26, 28 around the glazing (G) and to increase the mechanical resistance by absorbing chocks. A gasket 42, stretched around the glazing, ensures retention of the glazing within the frame, absorbs chocks and prevents infiltration of liquids between the frame and the glazing.

The tightening belt 40 is used for securing the different members of the frame clipped together, once assembled into the opening of the wall, and during use, for sliding windows for example, by compressing the corner 30 making the bridge between the extrusion 28 and the lower extrusion 26.

An elastomeric seal 38, typically comprising an elastomeric strip and an adhesive strip, may be applied about the periphery of the outer frame 24, and is compressed upon assembly of the frame by the user in the aperture of a wall, thereby sealing the assembled frame within the opening. Alternatively, instead of the elastomeric seal 38, the end user may use traditional sealant for sealing the assembled frame within the opening.

The present invention uses snap-in stops, so that no glue or rivet are required. FIG. 3 shows slot 19 in the lateral side 16, receiving the handle 21 of the lower mobile part when in the open position, to keep the slider window open.

The frame 10 described hereinabove used for fixed windows, sliding windows, hung windows and T-slider windows.

Figure 7:
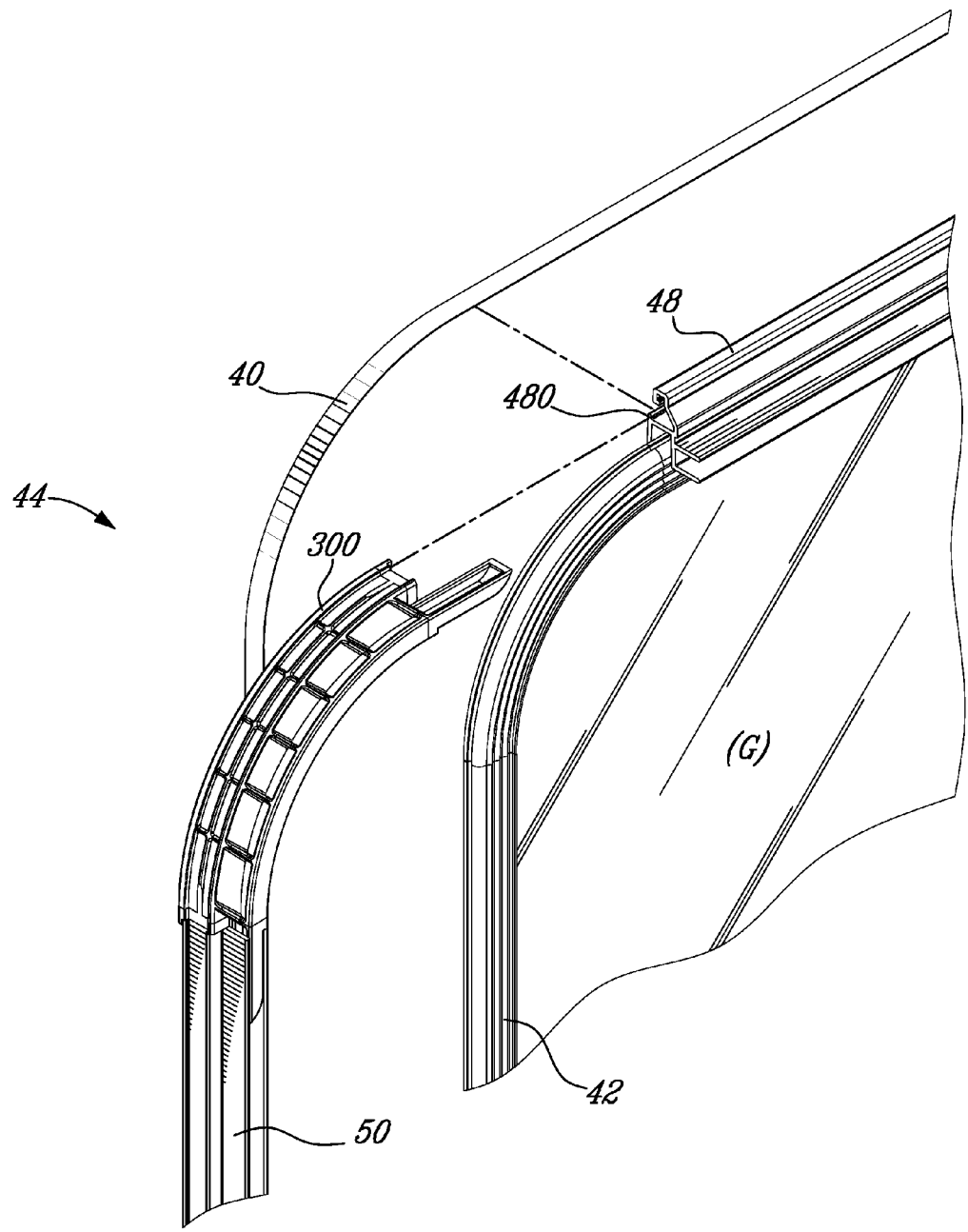
FIGS. 7 to 9 show details of a frame for a push-out window according to an embodiment of an aspect of the present invention.
Figure 8:
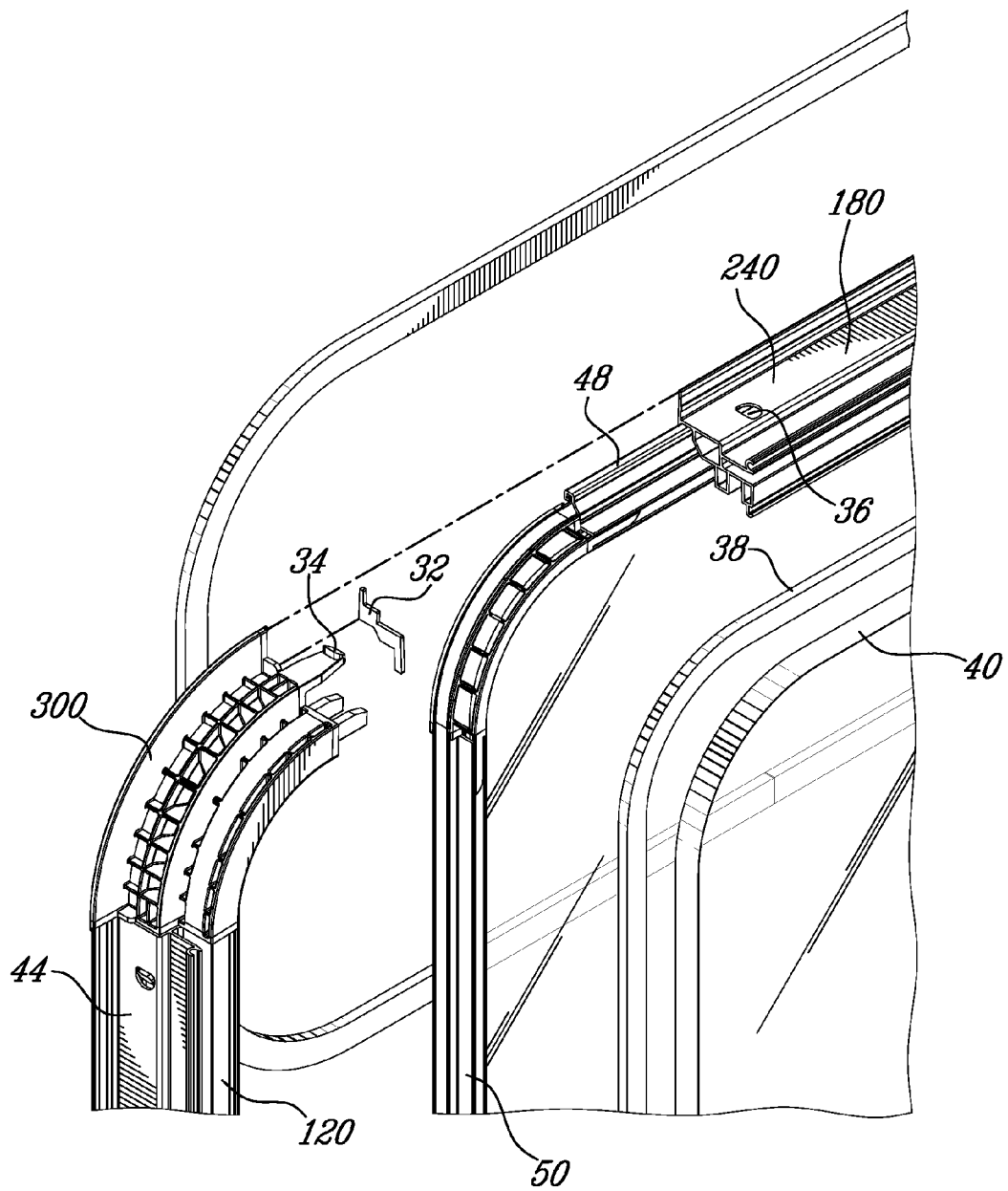
Figure 9C:
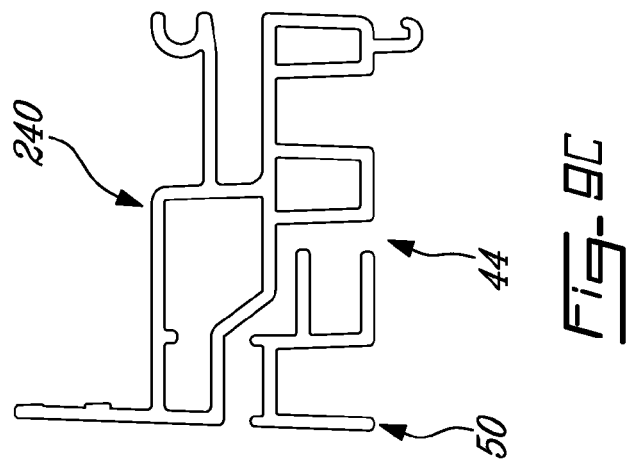
Figure 9B:
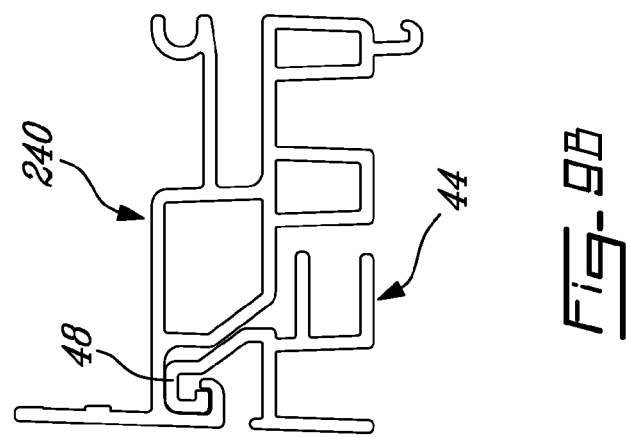
Figure 9A:
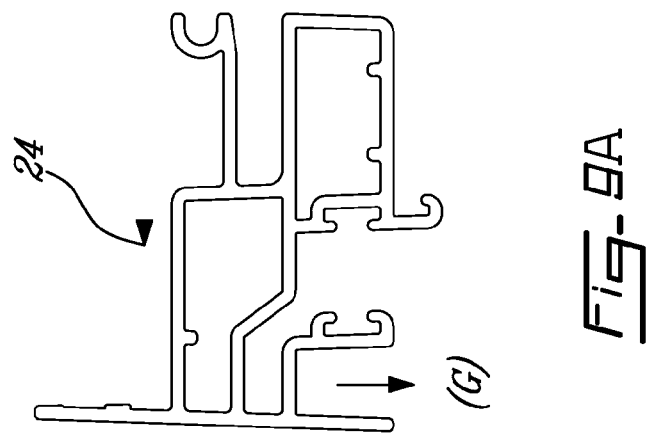

The frame for a push-out window (see FIG. 4), as detailed in FIGS. 7 to 9, comprises a modified outer frame 240 with lateral side arms 120 and 160, bottom side 140 and upper side 180, and an inner frame 44. The upper side 180 of the outer frame 240, as best seen in the top section of FIG. 9b, comprises a housing 480. The section of FIG. 9c show lateral the side arms 120 and 160, bottom side 140. The inner frame 44 comprises opposite side arms 50 (only left side arm 50 shown in FIGS. 7 and 8), a bottom arm (not seen) and an hinge 48, is assembled without using clip or joint, the different sections of the inner frame 44 secured together using a tightening belt 40 crimping on the gasket 42 of the glazing (G). As seen in FIG. 8, the hinge 48 of the inner frame 44 slides into the housing 480 of outer frame 240, then the compression seals 32 are positioned on each extremity of each corner 300 of the outer frame 240. As in the fixed configuration of FIG. 6, once the clips 34 of the corners 300 are engaged into the corresponding apertures 360 of the extrusions 280, 260, at each corner 300, leak tightness of the assembly is obtained. Moreover, in the push-out configuration of FIG. 8, when the outer frame 24o is completely assembled, the hinge 48 of the inner frame 44 is locked into position between the corners 300 of the outer frame 240, thereby positioned itself along a left to right position. A tightening belt 40 is then positioned around the periphery of the outer frame 240 to ensure leak tightness by compressing the compression seals 32, and increase the mechanical resistance as described in relation to FIG. 6. Elastomeric seals 38 may be further positioned one each side of the outer frame 240, one on the outside for adapting to the opening in the wall, and one on the inside, between the inner frame 44 and the outer frame 240, to provide an interface with the opening in the wall as discussed hereinabove.

Figure 10:
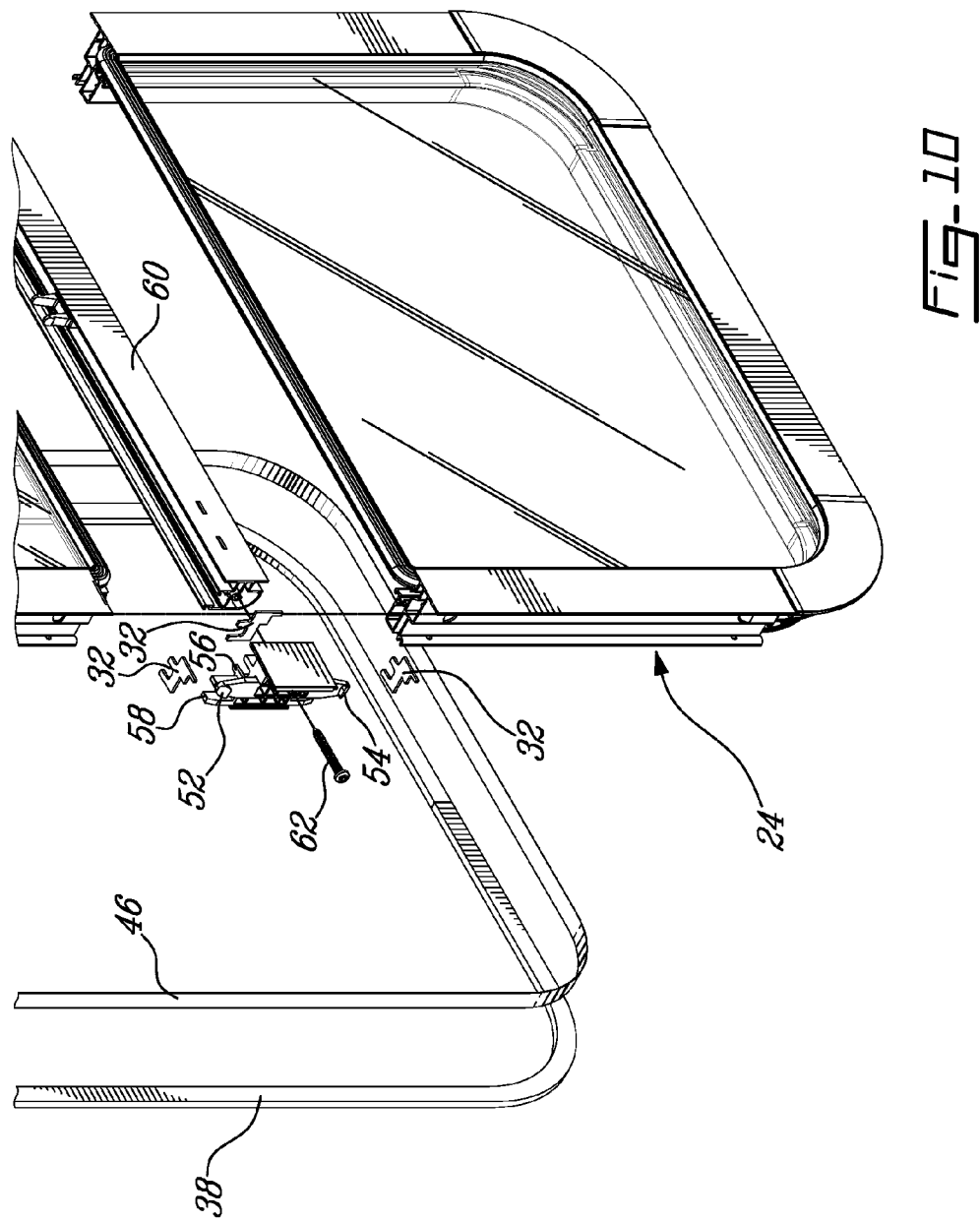
FIG. 10 show details of a frame for a T-slider window according to an embodiment of an aspect of the present invention.

Assembly of a frame for a T-slider window is illustrated in FIG. 10. Compression seals 32 are positioned at the tree extremities 54, 56 and 58 of T-members 52 (see FIG. 5). Each T-member 52 is assembled on a transversal arm 60, using screws 62 for example, for connection to the lateral sides 12 and 16. By creating a compression force on the compression seals 32 between the transversal arm 60 and the T-members 52, the screws 62 ensure leak tightness of the surface perpendicular to the axis of the screws 62. The remaining compression seals 32, on the T-members 52 and on the corners, are compressed under the tension of the tightening belt 40 and/or of the clips 34. The remaining elements of the frame are then assembled as described in the case of a fixed window in relation to FIG. 6.

The tightening belt 40 allows compression on all seals about the periphery of the assembly. The tightening belts 40 are found to reduce working clearances between the different elements of the frame (extrusions, compression seals and corners).

The elastomeric seal 38 positioned about the periphery allows sealing of the assembled frame within the opening in the wall, during installation of the frame. The elastomeric seals 38 are self adhered to the assembled frame, either between the outer frame and the periphery of the opening in the wall receiving the frame, or between the outer and inner frame.

Figure 11:
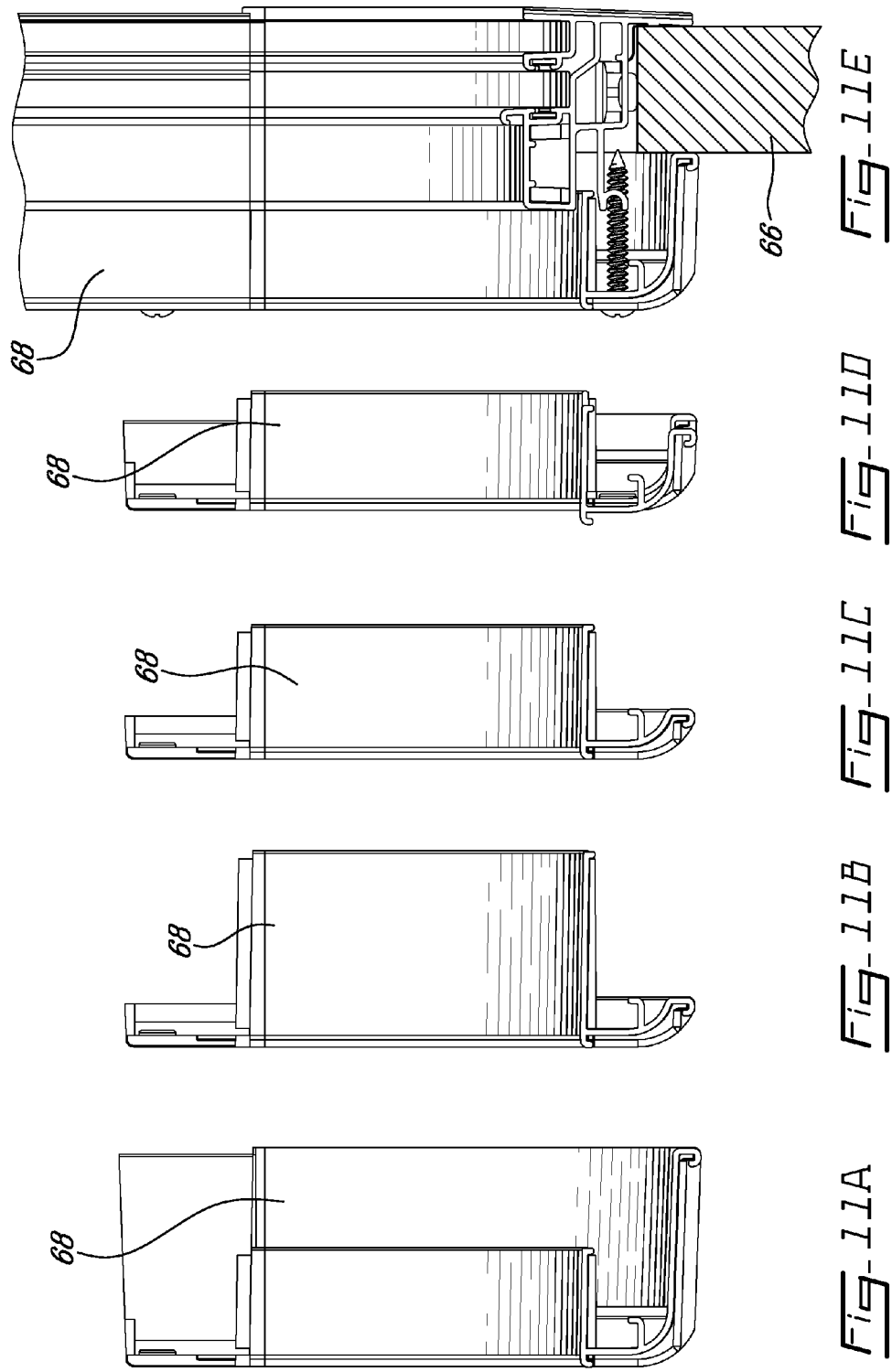
FIGS. 11 a)-e) show lock rings according to embodiments of an aspect of the present invention.

FIG. 11 show different lock rings 68 that may be used depending on the thickness of the wall 66 of a vehicle (not shown) and of the configuration of the window, i.e.: fixed window (see FIGS. 1 and 6 for example), sliding window (see FIG. 2 for example), hung window (see FIG. 3 for example), push-out window (see FIGS. 4 and 7 for example), or T-slider (see FIGS. 5 and 9 for example).

Figure 12:
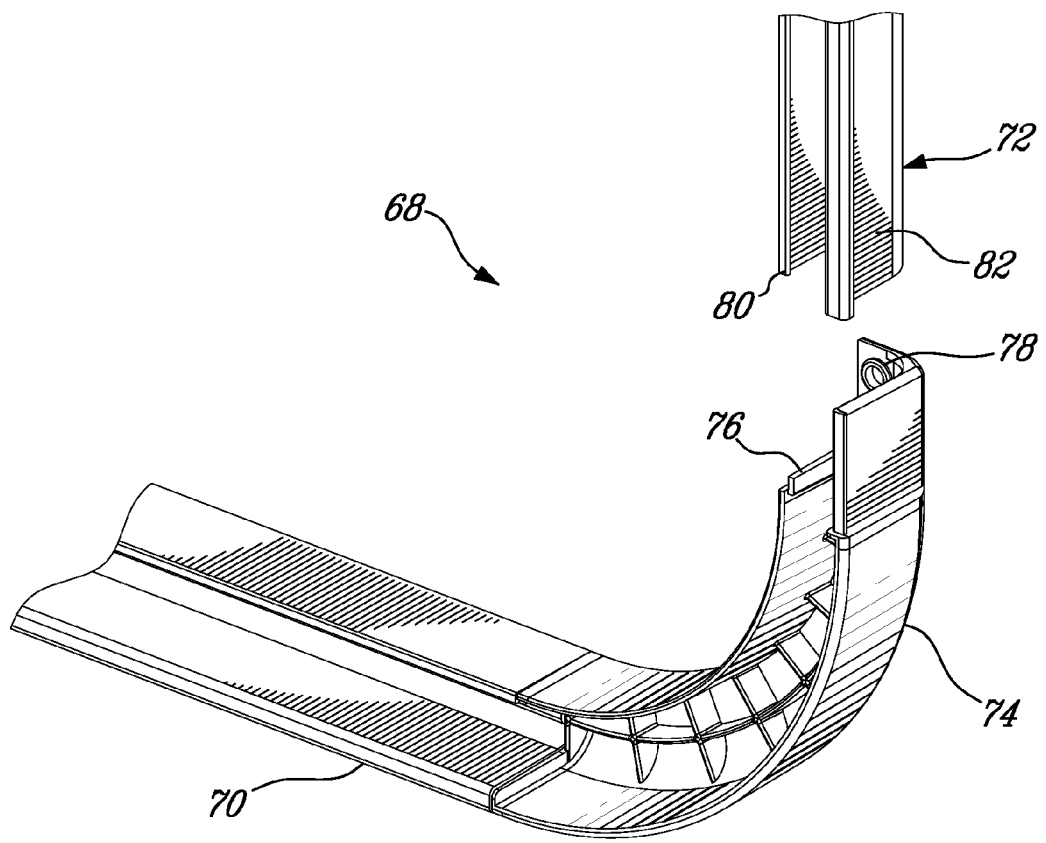
FIGS. 12 to 14 show details of lock rings according to an embodiment of an aspect of the present invention.
Figure 13:
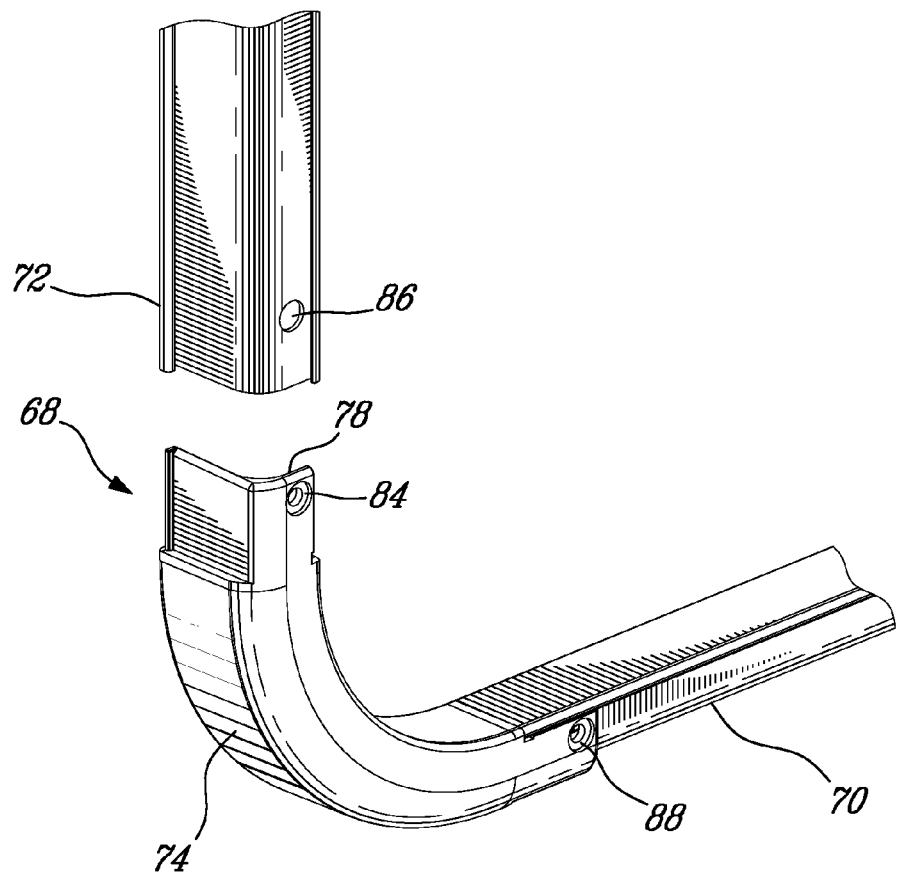
Figure 14:
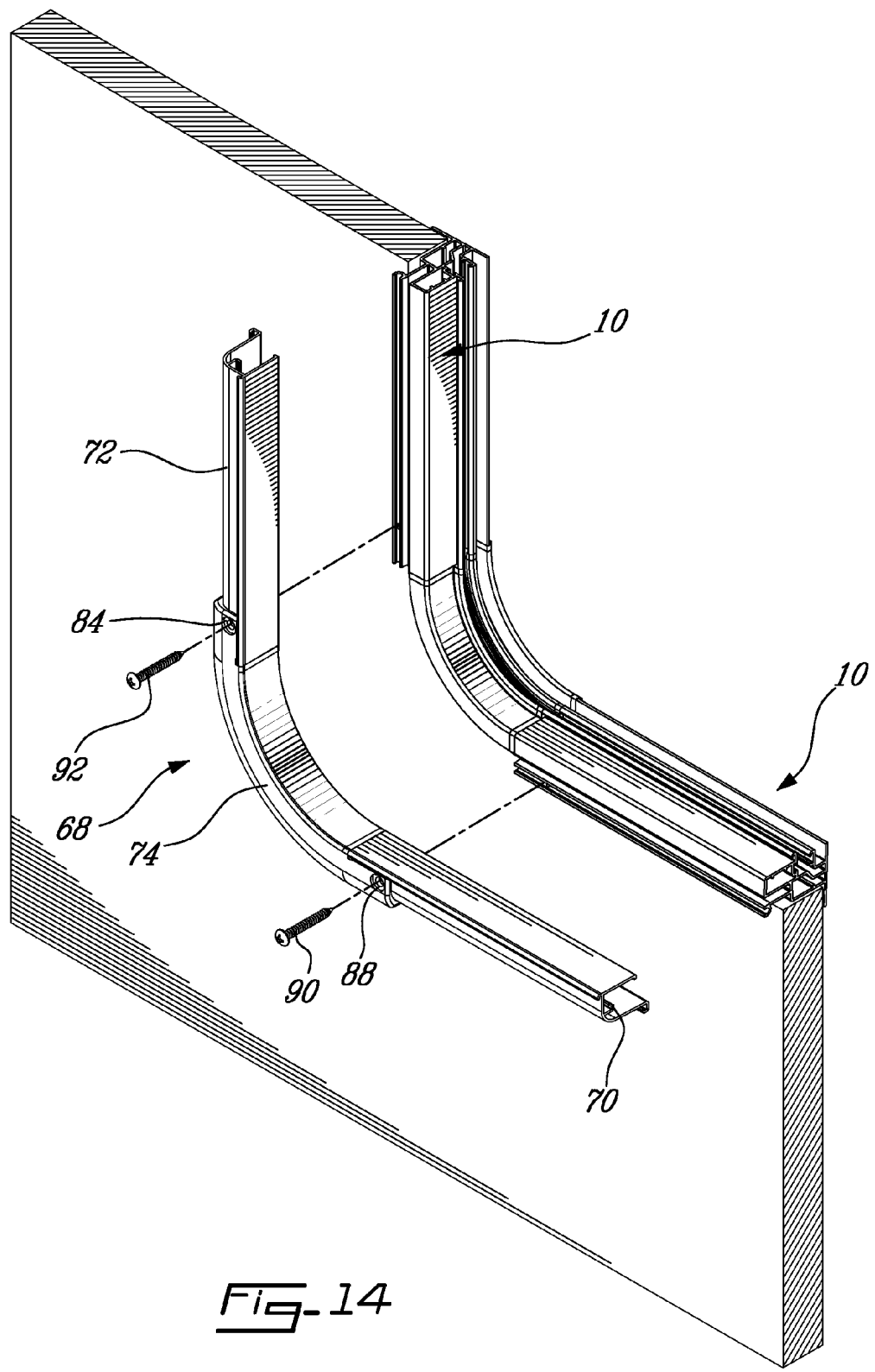

FIGS. 12-14 show details of such lock rings 68. A lock ring 68 comprises lateral extrusions 70, and top and bottom extrusions 72 (only two contiguous extrusions shown in the Figures) and corners 74 joining contiguous extrusions 70, 72. Each corner 74 comprises an inner wall 76 which comes in abutment with the inner wall 80 of the extrusion 72, and a higher outer wall 76 which engages the outer wall 82 of the extrusion 72 in a clipping action, screws 90, 92 being used to fasten together the extrusions 70 and 72 and the corner 74 through apertures 84, 86 and 88 shown in FIGS. 13 and 14. As best seen in FIG. 13, the screws 90, 92 go through the corner 74 and the extrusions 70, 72 of the ring 68 and reach the frame 10 which is provided with pre drilled holes (shown in 94 in FIG. 6) for ensuring alignment. Once assembled the ring 68 receives a tightening belt (not shown) stretched around its perimeter, for further securing the assembly. As shown in FIG. 11, rings 68 of different depth can be used. The extrusions 70, 72 may be aluminum extrusions, and the corners 74 plastic molded.

The present invention therefore allows eliminating adhesives and sealant, thereby maximizing ease of assembly and disassembly, reducing use of fasteners, reducing manufacturing time by using straight cuts and cut-to-size members and minimizing end machining.

The present invention provides light, modular structures with a reduced number of parts, easy to assemble, disassemble, recycle, reuse, adjust, tailor to specific needs, replace etc. . . .

The present invention makes use of materials such as polymeric resins (for example pvc, pc, pp, acetate, abs, nylon, fiber reinforcement), elastomers with various formats (extruded, slitted, kiss-cutt), injection and extrusions of aluminum, other metals and plastic.

Although the present invention has been described hereinabove by way of embodiments thereof, it may be modified, without departing from the nature and teachings of the subject invention as defined in the appended claims.

What is claimed is:

1. A frame assembly for a window, comprising at least a first frame, said frame having a circumferential length, said frame comprising a combination of members and compression seals, said members including straight members and corner members, wherein:
   each straight member includes opposite lateral sides, a bottom side and a top side, each straight member having a length between extremities thereof, and each straight member including an aperture on each of said extremity thereof;
   each corner member has a length between extremities thereof, each corner member including a clip at each of said extremities thereof, a respective seal being positioned between each corner member and a corresponding extremity of a straight member; and
   each corner member being retained between two of the straight members by each clip engaging a corresponding aperture of the straight member with the compression seal therebetween, an added lengths of said members forming the circumferential length of said frame, and said frame being readily disassembled by disengaging the clips between the corner members and the straight members;
   wherein said assembly further comprises a tightening belt, said tightening belt being tensioned around a periphery of the frame assembly once the corner members are clipped to said straight members with the compression seals therebetween, said tightening belt compressing the compression seals, thereby securing together the corners members and the straight members around a glazing and ensuring leak tightness of the assembly; and
   wherein said assembly is configured to be fitted auto-sealingly within an opening in a wall of a vehicle.

2. The frame assembly of claim 1, further comprising a second frame, said second frame comprising opposite side arms and a hinge, said hinge being slidingly received into one of the top side and the bottom side of said first frame.

3. The frame assembly of claim 1, further comprising a transversal arm and a T-member at extremities of said transversal arm, said T-members connecting said transversal arm to said lateral sides between said top and bottom sides.

4. The frame assembly of claim 3, comprising a compression seal at each extremity of the each T-member.

5. The frame assembly of claim 1, wherein a gasket is stretched around the glazing.

6. The frame assembly of claim 1, further comprising an elastomeric seal about the periphery of said first frame once assembled.

7. The frame assembly of claim 2, further comprising an elastomeric seal about the periphery of said first frame once assembled.

8. The frame assembly of claim 2, further comprising an elastomeric seal about an inner periphery of said first frame once assembled to seal said first and second frames together.

9. The frame assembly of claim 1, wherein said straight members are aluminum extrusions.

10. The frame assembly of claim 1, wherein said window is one of a fixed window, a sliding window, a hung window and a T-slider window.

11. The frame assembly of claim 2, wherein said window is a push-out window.

12. The frame assembly of claim 1, wherein said window is a hung window.

13. The frame assembly of claim 1, wherein said window is a T-slider window, said frame further comprising a transversal arm connected at each extremity thereof to one of the lateral side by a T-member.

14. The frame assembly of claim 1, further comprising at least one lock ring and capable of being adapted for installation of said frame in apertures in walls having different thicknesses.

* * * * *